United States Patent [19]

Belmond

[11] Patent Number: 5,509,326
[45] Date of Patent: Apr. 23, 1996

[54] PARKING BRAKE FOR MOTOR VEHICLE WITH A LOW APPLICATION FORCE

[75] Inventor: Jean-Marc Belmond, Nayemont-les-Fosses, France

[73] Assignee: Rockwell Body and Chassis Systems, France

[21] Appl. No.: 160,343

[22] Filed: Dec. 1, 1993

[30] Foreign Application Priority Data

Dec. 3, 1992 [FR] France ............ 92 14573

[51] Int. Cl.$^6$ .................................. G05G 1/04
[52] U.S. Cl. .............. 74/523; 74/543; 74/545; 74/567; 74/537; 74/538; 74/557
[58] Field of Search ................ 74/523, 557, 537, 74/538, 528, 543, 545, 546, 567

[56] References Cited

U.S. PATENT DOCUMENTS

| | | | |
|---|---|---|---|
| 4,454,785 | 6/1984 | Pürrer | 74/523 |
| 4,747,463 | 5/1988 | Yoshinaka et al. | 180/247 |
| 4,875,699 | 10/1989 | Levavi | 74/523 X |
| 5,187,998 | 2/1993 | Asano et al. | 74/538 X |

FOREIGN PATENT DOCUMENTS

| | | | |
|---|---|---|---|
| 0173513 | 3/1986 | European Pat. Off. | 74/523 |
| 0398848 | 11/1990 | European Pat. Off. | 74/523 |
| 0414603 | 2/1991 | European Pat. Off. | 74/523 |
| 2530358 | 1/1977 | Germany | 74/523 |
| 1-141154 | 6/1989 | Japan | 74/523 |
| 2147088 | 5/1985 | United Kingdom | 74/523 |
| 2264350 | 8/1993 | United Kingdom | 74/523 |

Primary Examiner—Vinh T. Luong

[57] ABSTRACT

This brake comprises a lever (1) articulated onto a pin (2), a soleplate (3) and a toggle joint mechanism (8) connected to the application cable (9); this mechanism (8) includes a connecting rod which is articulated onto the lever (1), the end of the cable (9) being connected to the end of the connecting rod (10) through the use of a balance bar (11) which can be moved translationally in a direction parallel to the cable (9). The mechanism (8) considerably decreases the forces for applying and releasing the brake. On application, the lever (1) is brought into abutment on the soleplate (3) so that the direction of the force (P) in the connecting rod (10), which force is brought about by tensioning the cable (9), passes above the pin (2), which keeps it in the applied position. A push-rod (16), subjected to a return force (F) and sliding inside the lever (1) automatically provides safety locking of the brake in the position for keeping it applied.

7 Claims, 5 Drawing Sheets

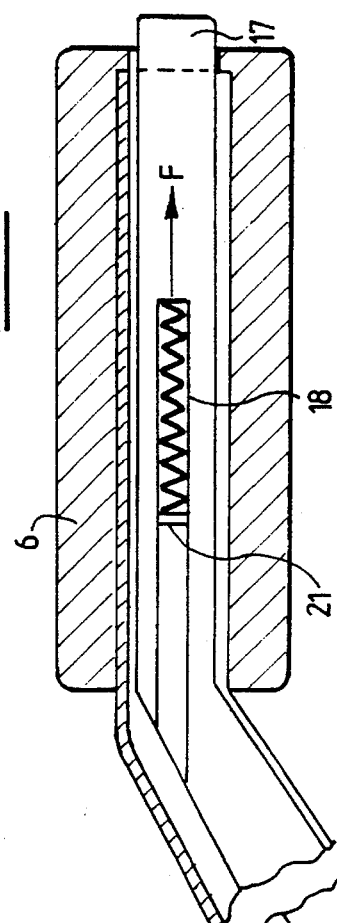
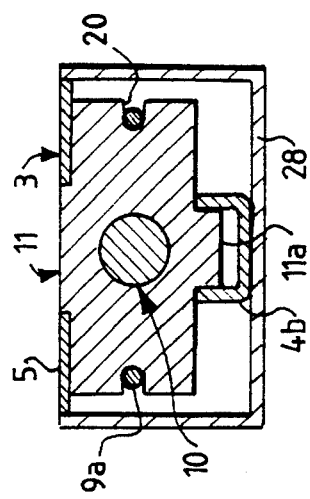
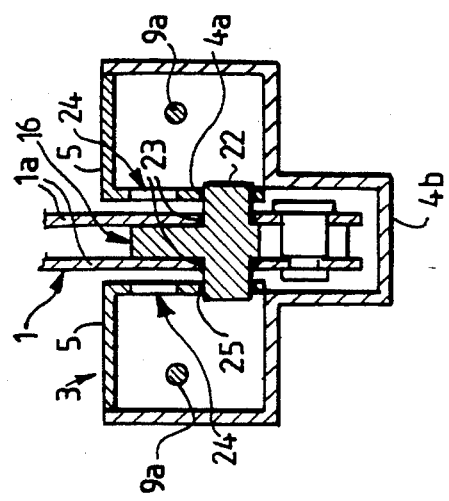
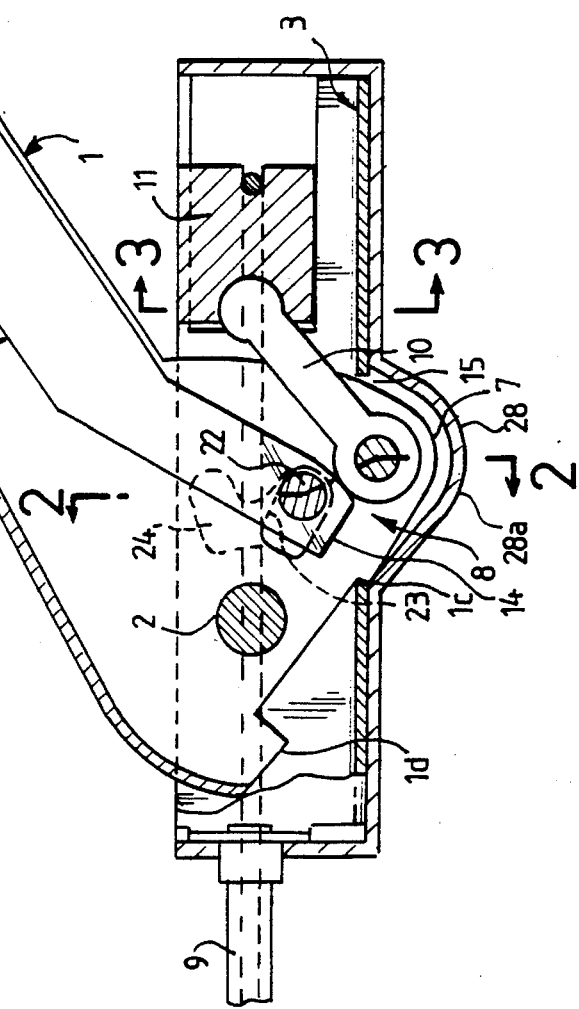

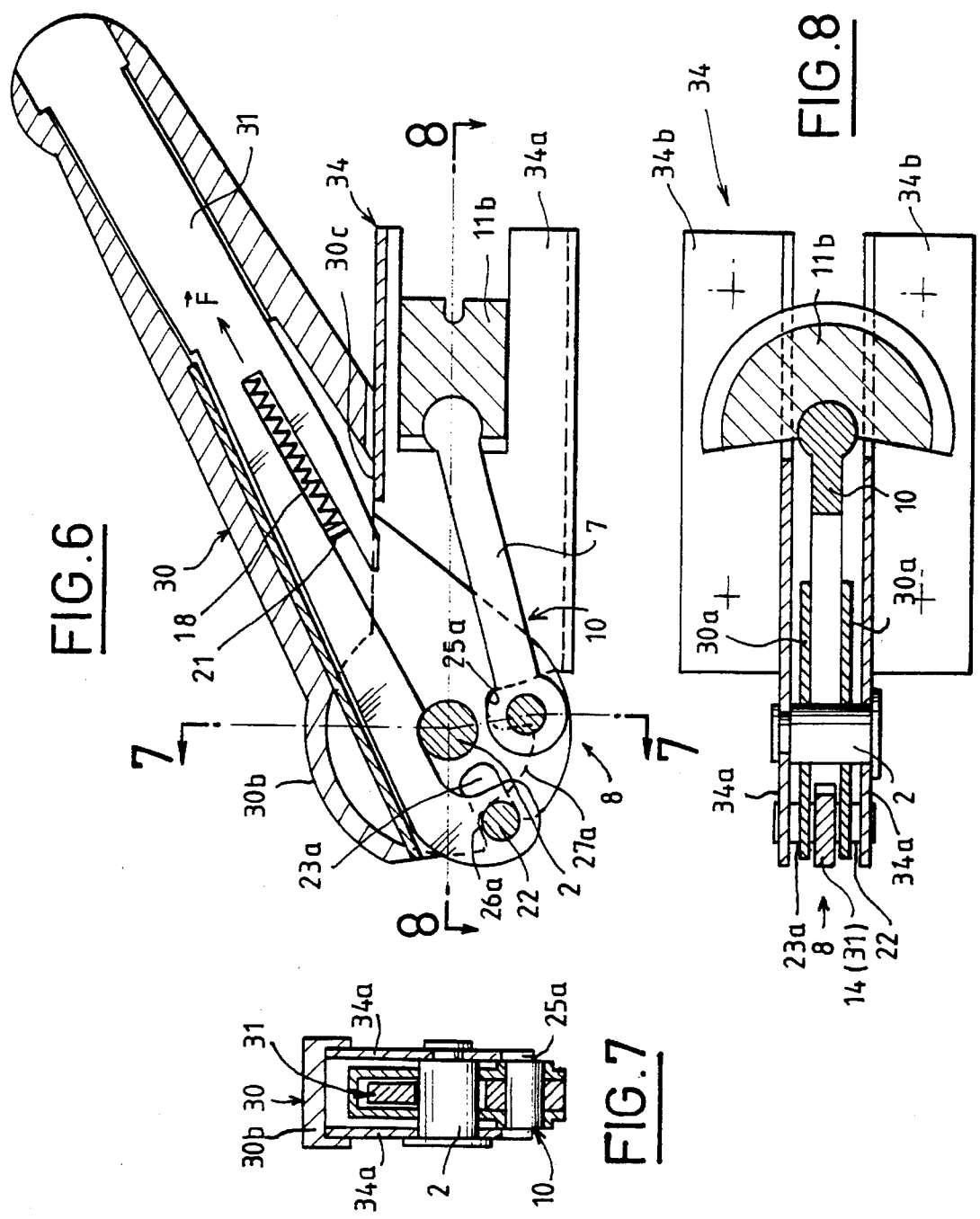

PARKING BRAKE FOR MOTOR VEHICLE WITH A LOW APPLICATION FORCE

BACKGROUND OF THE INVENTION

The subject of the present invention is a handbrake for a vehicle, of the type comprising a lever articulated onto a soleplate, connected to a cable for transmitting application force, and means for keeping and locking the lever in a given angular application position.

It is known that vehicle-parking handbrakes currently used generally include systems with ratchets and toothed sectors. The ergonomics of the control of these parking brakes is relatively unsatisfactory, because the force which must be developed at the lever is of the order of 35 to 40 dan to obtain adequate tension in the application cable.

The release of the brake additionally requires a supplementary relief force on the part of the user.

SUMMARY OF THE INVENTION

The object of the invention is to produce a parking brake in which the control for placing the lever in the applied position requires a force which is less than those demanded up to now, and the release of which may be obtained without supplementary relief force.

In accordance with the invention, the aforementioned keeping and locking means comprise a toggle joint mechanism connected, on the one hand, to the articulated end of the lever and, on the other hand, to the force transmission cable.

According to one embodiment of the invention, the toggle joint mechanism includes an arm secured to that end of the lever which is articulated to the soleplate, and a connecting rod which is articulated to the arm and fixed to the end of the force transmission cable, which connecting rod is connected to a balance bar which can be moved translationally inside the soleplate.

Such an articulation system makes it possible to operate the brake with a force which is distinctly less than those required up to now.

The tensioning of the cable brings about a force in the connecting rod the direction of which, at the end of application, is such that it passes beyond the pin about which the lever is articulated in the soleplate, the end of application position being obtained by bringing the lever into abutment on the soleplate.

According to another characteristic of the invention, the said means for keeping and locking the lever comprise a push-rod which can be moved translationally inside the lever, a first end of which push-rod projects from a grip for grasping the lever and the second end of which push-rod is equipped with lateral lugs which are engaged in oblong slots formed in lateral walls of the lever, and the :soleplate includes walls extending on each side of the articulated end of the lever and in which there are arranged cam profiles on which the lugs bear and can slide during the operation of the lever, these cam profiles including a first cutout in which the lugs are engaged when the lever is in the low released position, and a second cutout into which the lugs are inserted when the lever is in the high applied position, means being furthermore provided for elastically returning the push-rod to its initial position and to keep the lugs at the bottom of one or other of the cutouts of the cam.

BRIEF DESCRIPTION OF THE DRAWINGS

Other features and advantages of the invention will emerge during the description which will follow, given with reference to the appended drawings which illustrate two embodiments thereof by way of non-limiting examples.

FIG. 1 is a view in longitudinal section of a first embodiment of the handbrake according to the invention, in the released position with the lever lowered.

FIG. 2 is view in transverse section on 2—2 of FIG. 1.

FIG. 3 is a view in transverse section on 3/3 of FIG. 1.

FIG. 6 is a half longitudinal section half elevation view of a second embodiment of the brake according to the invention, in the released position with the lever lowered.

FIG. 7 is a view in transverse section on 7—7 of FIG. 6.

FIG. 8 is a view in longitudinal section on 8—8 of FIG. 7.

DESCRIPTION OF THE PREFERRED EMBODIMENTS

Figure 4:
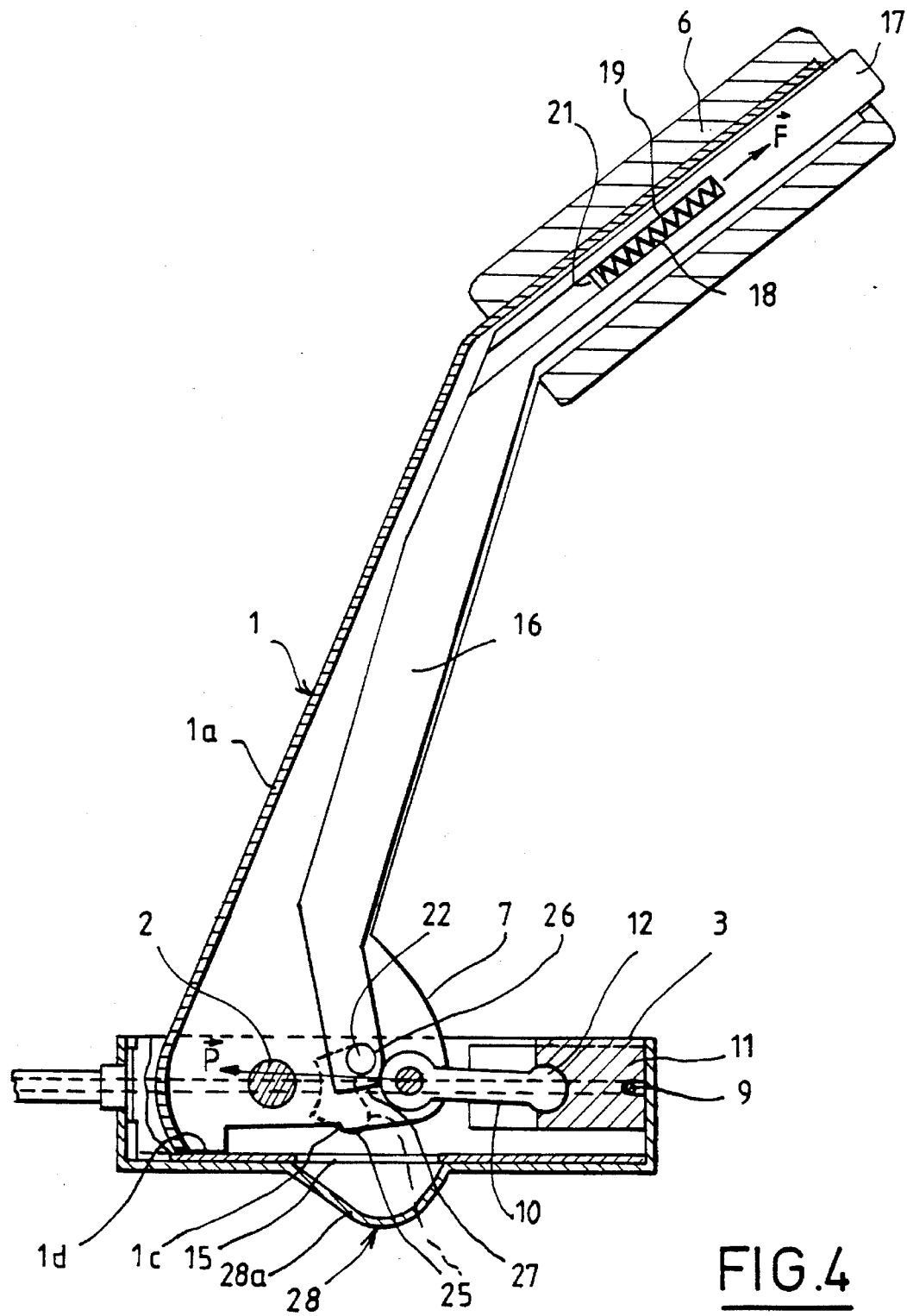
FIG. 4 is a view similar to FIG. 1, showing the brake in the applied position with the lever raised.

The parking brake for a motor vehicle which is represented in FIGS. 1 to 5 comprises a tubular lever 1, which is articulated on one of its ends about a transverse pin 2 of a support soleplate 3. This soleplate 3 consists (FIG. 5) of a longitudinal U section 4 (FIG. 5) open towards the top, that is to say towards the lever 1, and the walls 4a of which carry the pin 2, and of longitudinal flanges 5 which extend the walls 4a of the section 4 at right angles.

The lever 1 includes, at its end opposite the articulation pin 2, an end grip 6 for manual grasping, which forms an obtuse angle with the rest of the lever 1. On the side of its articulated end, this lever has the shape of an arm 7 on which is articulated a connecting rod 10, which, together with the arm 7, forms a toggle joint mechanism 8. The end of the connecting rod 10 opposite its articulation on the arm 7 is connected to a cable 9 for transmitting the force for applying the brake, by any suitable means. This connection may, for example, be produced as represented by means of a balance bar 11 connected to the connecting rod 10 by an end ball joint 12 of this connecting rod. The balance bar 11 is mounted so that it can be moved in longitudinal translation in openings 13 formed opposite each other in the walls 4a of the soleplate 3, and includes, at its lower part, an outgrowth 11a (FIG. 3) which engages between the parts of the walls 4a delimiting the lower edges of the openings 13, so as to allow the sliding of the balance bar 11 in the soleplate 3 to be guided. The balance bar 11 additionally extends laterally under and between the flanges 5 (FIG. 3) which thus supplement the guidance of the balance bar 11 by the walls 4a. A groove 20 is formed on the periphery of the balance bar 11 to receive the cable 9 which thus surrounds the balance bar 11 on three sides, by forming two strands 9a (FIGS. 2 and 3). The balance bar 11 may slide in a direction parallel to the cable 9.

The rest position of the lever 1 is determined by its stop-piece profile 1c formed at its end opposite the grip 6, when this stop piece 1c is in contact with the edge of an opening 15 arranged in the bottom 4b of the section 4. The applied position of the lever 1 is obtained when a second stop-piece profile 1d of this lever, formed by an end cutaway close to the connecting rod 10, comes into contact with the bottom 4b of the soleplate 3 (FIG. 4). The latter is fixed to the floor of the vehicle (not represented) so that the application and operation forces are taken up by the structure of the vehicle.

The means for the keeping and for the safety locking of the lever 1 in the applied position comprise a push-rod 16 which can be moved by translation inside the lever 1, and including an end part 17 which is bent over with respect to the rest of the push-rod 16, and capable of sliding inside the grasping grip 6. The push-rod 16 is equipped with return means which, in the example illustrated, consist of a compression spring 18 located in a longitudinal housing 19 of the end part 17 of the push-rod 16, and of which the end closest to the soleplate 3 bears on an element 21 secured to the lever 1. The opposite end of the compressed spring 18 exerts on the push-rod 16, a thrust F which tends to keep the push-rod in a position in which the end of its end part 17 projects slightly from the end of the grip 6.

Figure 5:
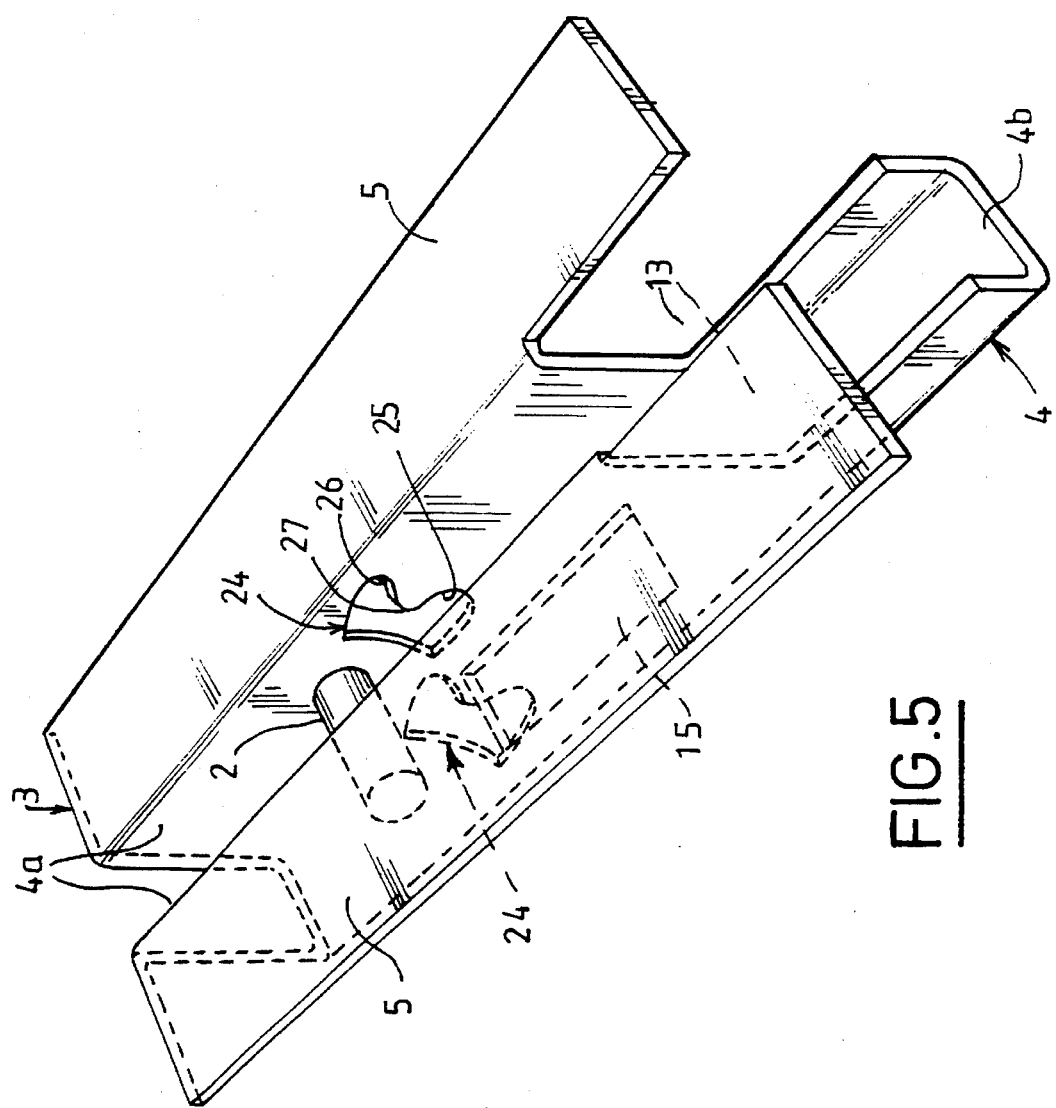
FIG. 5 is a perspective view with partial cutaway of the soleplate of the brake of FIGS. 1 to 4.

The means for locking the lever 1 also comprise two lateral lugs 22 formed on the end 14 of the push-rod 16, opposite its end part 17. These lugs 22 are engaged in oblong slots 23 formed facing one another in the walls 1a of the lever 1, between the pin 2 and the openings 13. In addition, openings 24, more particularly visible in FIG. 5, are also arranged in the walls 4a, the edges of which openings 24 each define a cam profile, consisting of a first lower cutout or notch 25 and of a second upper cutout or notch 26, separated by a nose 27 from the lower cutout 25. The lateral lugs 22 are engaged simultaneously in the oblong slots 23 and the openings 24, either bearing in the lower cutouts 25 when the lever 1 is in the low released position (FIG. 1), or in the upper cutouts 26 when the lever 1 is in the raised applied position (FIG. 4), the passage from one position to the other taking place by the lugs 22 bearing by sliding on the profile of the cutouts 25, 26 and of the inclines formed by the noses 27.

The toggle joint mechanism 8 projects externally from the bottom 4b of the soleplate 3 via the opening 15 formed for that purpose, when the lever 1 is in the low released position (FIG. 1). A cap 28, produced from a flexible material such as an elastomer, envelops the soleplate 3 and includes a boss 28a facing the opening 15, so as to cover the projecting part of the toggle joint mechanism 8. The application cable 9 extends, from the balance bar 11, between the walls 4a and the lateral walls of the cap 28 (FIG. 2). This cable 9 (or these cables) is(are) slipped into the cap 28 before being fitted to the balance bar 11. The tension is adjusted either at the balance bar (which implies that the cable is in two parts), or at a sheath stop piece on the cable 9 (case of the single cable joined intermediately or otherwise), or on a joining piece for the cable 9, in a manner which is known and not represented.

The operation of the handbrake which has just been described takes place as follows.

With the lever in the low position (FIG. 1), the toggle joint mechanism 8 projects via the opening 15 at the bottom of the soleplate 3. The stop-piece profile 1c bears on the edge of the opening 15 away from the balance bar 11, the lugs 22 are positioned in abutment in the lower cutouts 25 of the cam profiles of the openings 24, and are held there by the thrust F developed on the push-rod 16 by the return spring 18.

During an application operation, the lever 1 is rotated with respect to the soleplate 3 about its pin 2, so as to raise it until its stop-piece profile 1d is brought into contact with the bottom 4b of the soleplate 3 (FIG. 4). During this application operation, the lugs 22 slide over the cams of the openings 24, from the lower notches 25 over the noses 27 and become accommodated in the bottom of the upper notches 26. A translation of the push-rod 16 counter to the return force F of the spring 18 corresponds to this displacement, which spring 18 is therefore momentarily compressed, and which relaxes when the lugs 22 penetrate into the upper cutouts 26. During this movement of the push-rod 16, the lugs 22 also undergo a translation in the oblong slots 23. At the end of the application operation, the elastic return strain F pushes the lugs 22 into the upper cutouts 26 and holds them there, providing a safety locking of the brake in the applied position.

In this position, as in the released position, the end part 17 of the push-rod 16 projects slightly outside the grip 6, so that the unlocking of the safety feature of the brake is obtained without having to relieve the contact force between the profile 1d and the bottom 4b, by actuating the push-rod 16 using the thumb at the end of its end part 17. This actuation makes it possible to make the push-rod 16 slide counter to the spring 18 and thus to disengage the lugs 22 from the upper cutouts 26 of the cams, allowing the lever 1 to return to the rest position after the lugs 22 have slid over the noses 27, by means of a limited force on the lever 1.

It should moreover be noted that the toggle joint mechanism 8 is dimensioned and positioned, with respect to the pin 2 about which the lever 1 rotates, so that in the applied position of the brake, with the lever I raised, the cable 9 transmits, to the connecting rod 10, via the balance bar 11, a force resultant P directed above the pin 2. In this way the resultant couple on the lever 1 tends to keep the latter stably in its raised applied position, in which it is in contact with the bottom 4b of the soleplate 3 via its stop-piece profile 1d.

The second embodiment of the parking brake, illustrated in FIGS. 6 to 10, is more compact than the previous one, owing to the fact that the lever 30 no longer includes a bent-over grip, but is essentially straight. It is correspondingly equipped with a push-rod 31, sliding in a longitudinal housing of the lever 30, and including a transverse end part 32 which extends over the entire width of the hand grip 33 for grasping the lever 30 (FIG. 10) and can slide in a housing 33a of the latter. The end part 32 projects outside the grip 33 when the spring 18 is not compressed, like the end part 17 of the previous embodiment.

Moreover, in this embodiment of the brake, the cam profiles are no longer delimited by openings 24 as in the previous embodiment, but are arranged directly on the ends of the soleplate 34. These cams thus each consist of a first cutout 25a close to the connecting rod 10, an incline 27a further from the connecting rod 10, and finally of a cutout 26a located at the end of the U-shaped walls 34a of the soleplate 34. In addition, the brake according to this embodiment is no longer equipped with a cap, which is not necessary, because the passages for the cable are sealed, in a manner which is known per se and not represented, by components mounted on the floor of the vehicle.

It is also noted that the longitudinal flanges 34b of the soleplate 34 are interrupted before the pin 2 for rotation, and that the balance bar 11b consists of a cylindrical component. Oblong slots 23a in which the lugs 22 of the push-rod 31 are engaged are formed on the ends of the walls 30a of the lever 30, on which the connecting rod 10 is articulated.

The rest position of the lever 30 is fixed on a stop-piece profile 30c on the soleplate 34, this profile 30c being formed no longer at the articulated end of the brake as in the previous case, but in an intermediate position, so as to be able to bear on the flanges 34b of the soleplate 34 when the brake is in the released position (FIG. 6). In effect, in this embodiment, the makeup of the toggle joint mechanism is such that it is no longer necessary to provide a passage opening in the bottom of the soleplate 34 when the brake is in the released rest position. In addition, in the released position, the lugs 22 are located at the entrance of the oblong slots 23a.

Figures 9, 10:
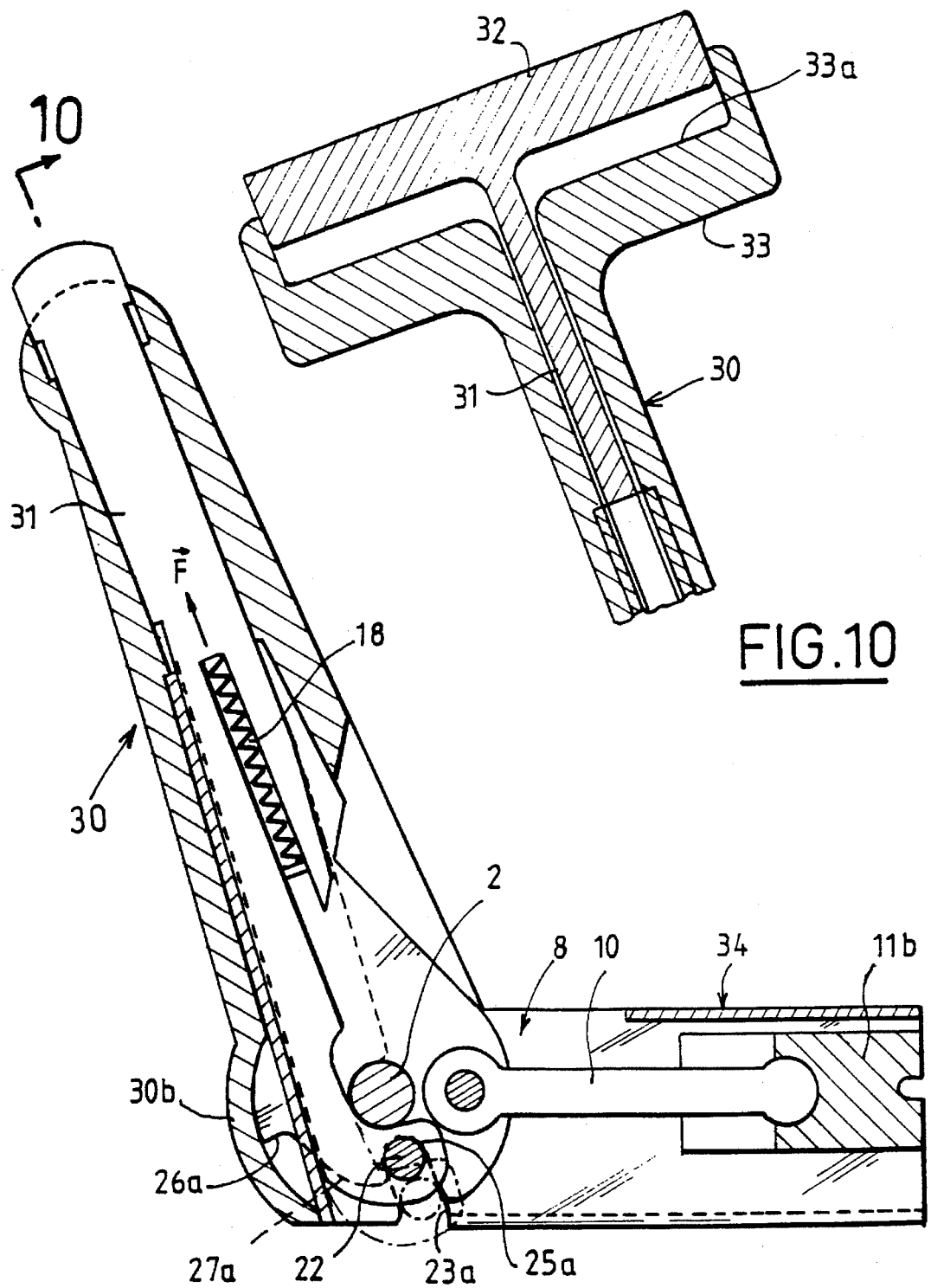
FIG. 9 is a view similar to FIG. 6 showing the brake in the applied position with the lever raised.
FIG. 10 is a partial view in transverse section of the lever in the direction 10 of FIG. 9.

Moreover, the safety locking of the brake in its applied position (FIG. 9) is obtained by simultaneous engagement of the lugs 22 in the bottom of the elongate slots 23a and in the cutouts 25a of the cams, these cutouts for this purpose being suitably orientated so as to extend in a direction which forms an obtuse angle with the bottom of the soleplate 34. This direction is also that of the return thrust F exerted by the spring 18 on the push-rod 31, so that in the applied position, the lever 30 forms an obtuse angle with the bottom of the soleplate 34 and with the connecting rod 10 (FIG. 9).

To release the brake, it is sufficient for the user to take the grip 33 and to press with the palm of the hand or with the thumb on the end part 32, counter to the force of the return spring 18, to make the lugs 22 come out of the notches 25a of the cam. Once this operation has been carried out, the lugs can then slide freely over the inclines 27a and become placed in abutment in the cutouts 26a, when the lever 30 is completely lowered (FIG. 6).

The tension available in the transmission cable or cables 9 may be set to the desired value by acting on the dimensions of the constituent components (length of the connecting rod, of the arm, permitted angle of travel of the lever, etc.). It may be made possible to set the travel by allowing a lengthwise adjustment of the arm 6 and/or of the connecting rod The toggle joint mechanism 8 of the brake requires only a limited force to operate it, on the part of the user, the force being less than approximately 15 dan at the lever, to obtain the adequate maximum tension in the cable or cables. Another advantage of the brake according to the invention lies in the fact that the operation of the push-rod 16 or 31 for safety locking requires no supplementary force for relieving the brake. In effect, it is held in the applied position by the choice of the direction of the force P in the connecting rod 10, so that this force guarantees a sufficient couple to keep the lever in the high position in abutment on the soleplate. If the lever in the high position is in abutment on the soleplate, the force present in the locking mechanism, with the brake applied, is zero. If the lugs 22 are used to stop the lever 1, 30 with respect to the soleplate 3, 34, the force remains very low, the connecting rod 10 at the origin of the force P being close to its top dead centre.

The invention is capable of numerous embodiment variants.

I claim:

1. A parking brake for a vehicle, said parking brake including a soleplate, a force transmitting cable, and a lever, said lever articulably attached to said soleplate at an articulation end about an articulation point, said lever having lateral walls and said lateral lever walls having oblong slots formed therein, said soleplate having walls extending on each side of said lever about said articulation end and said lose plate walls having cam profiles arranged thereon, said parking brake comprising:

means for keeping and locking said lever in a given angular position, said means for keeping and locking the lever (1) comprising a push-rod (16) translatably mounted within said lever, said push-rod having a first end and a second end, said first end (17) of said push-rod projecting from a grip (6) for grasping said lever and said second end of said push-rod having lateral lugs (22) engaged in said oblong slots (23) of said lateral walls (1a) said lever, bearing upon and sliding upon said cam profiles during operation said lever.

2. A parking brake according to claim 1, wherein said toggle joint mechanism includes are arm (7) secured to said articulable end of said lever (1) a connecting rod (10) having first and second ends wherein said first connecting rod end is articulated to said arm and wherein said second connecting rod end is fixed to the end of said force transmission cable (9), and wherein said connecting rod is connected to a balance bar (11) wherein said balance bar moves translationally inside the soleplate (3).

3. A parking brake according to claim 1, wherein said cam profiles (25,26,27) includes a first cutout (25) in which said lugs (22) are engaged when said lever (1) is in the low released position, and wherein said cam profiled further include a nose (27) and a second cutout (26) into which said lugs are engaged when said lever is in the high applied position, said parking brake further comprising means (18) for elastically returning said push-rod (16) to it initial position and to keep said lugs at the bottom of one or other of cutouts (25,26) of said cam.

4. A parking brake according to claim 3, wherein said means for returning said push-rod (16; 34) comprises a compression spring (18) located inside an end part (17) of said push-rod, inside said grip (6;33) of said lever (1;30), one end of said compression spring bearing on an element (21) secured to said lever, and wherein another end of said compression spring exerts on said end part and said push-rod a return force (F) pointing in the direction which tends to keep said lugs (22) of said pus-rod at the bottom of one or the other of said cutouts depending upon the position of said lever being either said low released position or said high applied position, wherein said lever is released from either position by grasping said grip and simultaneously pushing manually on said end part of said push-rod 5. A parking brake according to claim 3, wherein said cam profiles (25,26,27) are produced in openings (24) formed in said lateral walls (4a) said soleplate.

6. A parking brake according to claim 1, wherein said cam profiles (25a, 26a, 27a) are formed so as to be connected by an incline (27a) over which said lugs (22) slide over.

7. A parking brake according to claim 6, wherein said lever is hollow and thereby has outer walls, and wherein said oblong slots (23a) are formed from outer walls (30a) of said lever.

* * * * *